United States Patent [19]
Sittler

[11] Patent Number: 5,731,522
[45] Date of Patent: Mar. 24, 1998

[54] TRANSMITTER WITH ISOLATION ASSEMBLY FOR PRESSURE SENSOR

[75] Inventor: Fred C. Sittler, Excelsior, Minn.

[73] Assignee: Rosemount Inc., Eden Prairie, Minn.

[21] Appl. No.: 818,379

[22] Filed: Mar. 14, 1997

[51] Int. Cl.$^6$ .................................................. G02C 19/04
[52] U.S. Cl. .................................. 73/708; 73/706; 73/723
[58] Field of Search .............................. 73/706, 717, 716, 73/723, 756, 708

[56] References Cited

U.S. PATENT DOCUMENTS

| | | | |
|---|---|---|---|
| D. 317,266 | 6/1991 | Broden et al. | D10/46 |
| 3,405,559 | 10/1968 | Moffatt | 73/398 |
| 4,092,696 | 5/1978 | Boesen et al. | 73/753 X |
| 4,196,632 | 4/1980 | Sikorra | 73/718 |
| 4,208,782 | 6/1980 | Kurtz et al. | 29/580 |
| 4,236,137 | 11/1980 | Kurtz et al. | 338/4 |
| 4,276,533 | 6/1981 | Tominaga et al. | 338/4 |
| 4,301,492 | 11/1981 | Paquin et al. | 361/283 |
| 4,434,451 | 2/1984 | Delatorre | 73/718 X |
| 4,443,293 | 4/1984 | Mallon et al. | 156/647 |
| 4,479,070 | 10/1984 | Frische et al. | 310/338 |
| 4,586,108 | 4/1986 | Frick | 361/283 |
| 4,603,371 | 7/1986 | Frick | 361/283 |
| 4,625,559 | 12/1986 | Carter et al. | 73/706 |
| 4,790,192 | 12/1988 | Knecht et al. | 73/721 |
| 4,798,089 | 1/1989 | Frick et al. | 73/706 X |
| 4,800,758 | 1/1989 | Knecht et al. | 73/727 |
| 4,833,922 | 5/1989 | Frick et al. | 73/706 X |
| 4,934,193 | 6/1990 | Hayata | 73/706 X |
| 4,993,754 | 2/1991 | Templin, Jr. | 285/189 |
| 5,005,421 | 4/1991 | Hegner et al. | 73/72 |
| 5,022,270 | 6/1991 | Rud, Jr. | 73/706 |
| 5,024,098 | 6/1991 | Petitjean et al. | 73/706 X |
| 5,081,867 | 1/1992 | Yamada | 73/517 |
| 5,094,109 | 3/1992 | Dean et al. | 73/718 |
| 5,095,755 | 3/1992 | Peterson | 73/706 |
| 5,115,676 | 5/1992 | Lee | 73/706 |
| 5,133,215 | 7/1992 | Lane, III et al. | 73/706 X |
| 5,157,972 | 10/1992 | Broden et al. | 73/718 |
| 5,161,415 | 11/1992 | Kodama et al. | 73/706 X |
| 5,178,015 | 1/1993 | Loeppert et al. | 73/718 |
| 5,201,228 | 4/1993 | Kojima et al. | 73/724 |
| 5,214,961 | 6/1993 | Kojima et al. | 73/715 |
| 5,227,068 | 7/1993 | Runyon | 210/618 |

(List continued on next page.)

FOREIGN PATENT DOCUMENTS

| | | |
|---|---|---|
| 0 086 737 A1 | 8/1983 | European Pat. Off. . |
| 0 521 246 A2 | 1/1993 | European Pat. Off. . |
| 38 39 515 A1 | 6/1989 | Germany . |
| 42 44 450 A1 | 1/1993 | Germany . |
| 705124 | 3/1954 | United Kingdom . |
| WO 93/22644 | 11/1993 | WIPO . |

OTHER PUBLICATIONS

*Nova Sensor—Silicon Sensors and Microstructure*, "Creep of Sensor's Elastic Elements: Metals versus Non–metals, K. Bethe, D. Baumgarten and J. Frank, Jun. 1990, pp. 844–849.
*Nova Sensor* "Silicon Sensors and Microstructure", pp. 5.4–5.8, 8.21–8.23, 9.9–9.10, 9.13–9.15.
"Sapphire Transducer Works Under Pressure," *Machine Deesign*, vol. 59, No. 3, Feb. 12, 1987, p. 72.

*Primary Examiner*—Elizabeth L. Dougherty
*Attorney, Agent, or Firm*—Westman, Champlin & Kelly, P.A.

[57] ABSTRACT

A process control transmitter includes a transmitter housing and transmitter circuitry adapted for providing a transmitter output related to a sensed pressure. A sensor coupling in the housing defines a pressure sensor cavity which is filled with isolation fluid. An isolation diaphragm separates the sensor cavity from a process fluid and is adapted to transmit pressure therebetween. The pressure sensor is mounted in the sensor cavity and provides an output related to pressure to the transmitter circuitry. A thermal compensation member is coupled to the sensor cavity and has a thermal expansion coefficient which is different than a thermal expansion coefficient for the sensor coupling. The compensation member is adapted to compensate for pressure changes due to thermal expansion of the components or isolation fluid.

12 Claims, 3 Drawing Sheets

U.S. PATENT DOCUMENTS

| | | | |
|---|---|---|---|
| 5,287,746 | 2/1994 | Broden | 73/706 |
| 5,319,981 | 6/1994 | Mei et al. | 73/706 |
| 5,337,612 | 8/1994 | Evans | 73/706 |
| 5,349,492 | 9/1994 | Kimura et al. | 361/283.4 |
| 5,381,300 | 1/1995 | Thomas et al. | 361/280 |
| 5,424,650 | 6/1995 | Frick | 324/688 |
| 5,524,492 | 6/1996 | Frick et al. | 73/706 |
| 5,531,120 | 7/1996 | Nagasu et al. | 73/706 |

5,731,522

TRANSMITTER WITH ISOLATION ASSEMBLY FOR PRESSURE SENSOR

BACKGROUND OF THE INVENTION

The present invention relates to a pressure transmitter of the type used to monitor pressure of an industrial process. More specifically, the invention relates to an isolation assembly for a pressure sensor in a transmitter.

Pressure transmitters use an isolation assembly having an isolation diaphragm which isolates a pressure sensor carried in a pressure sensor coupling in the transmitter from the process fluid being sensed. Pressure is transferred from the isolation diaphragm to a sensor cavity of the sensor coupling which carries the sensor and a substantially incompressible isolation fluid. The pressure of the isolation fluid reflects the pressure of the process fluid and the pressure sensor responsively provides an output. U.S. Pat. No. 4,833,922 entitled "MODULAR PRESSURE TRANSMITTER", U.S. Pat. No. 5,094,109 entitled "PRESSURE TRANSMITTER WITH STRESS ISOLATION DEPRESSION", and U.S. Pat. No. 5,524,492 entitled "PRESSURE TRANSMITTER ISOLATION DIAPHRAGM" show pressure transmitters of this type.

Thermal expansion of components in the transmitter can cause errors in pressure measurements. For example, compression and thermal expansion of the isolation fluid, typically an oil, can introduce errors in pressure measurement. Additionally, thermal expansion of components of the isolation assembly can cause a change in the measured pressure.

SUMMARY OF THE INVENTION

The pressure invention includes a pressure transmitter for sensing pressure of a process fluid. The transmitter includes a transmitter housing, transmitter circuitry and a pressure sensor coupled to the transmitter circuitry. A sensor coupling in the transmitter housing defines a sensor cavity around the pressure sensor which is filled with a isolation fluid. The sensor coupling has a first thermal expansion coefficient. An isolation diaphragm is coupled to the sensor coupling and seals the sensor cavity from the process fluid. A thermal compensation member couples to the sensor cavity and has a second thermal expansion coefficient which is selected whereby the volume changes in a manner which compensates for pressure changes due to thermal expansion of the sensor coupling and/or the isolation fluid. Various aspects of the invention include reducing the amount of isolation fluid, using a thin isolation diaphragm and compensation for thermal expansion of the isolation fluid and associated mechanical components.

DETAILED DESCRIPTION OF THE PREFERRED EMBODIMENTS

Figure 1:
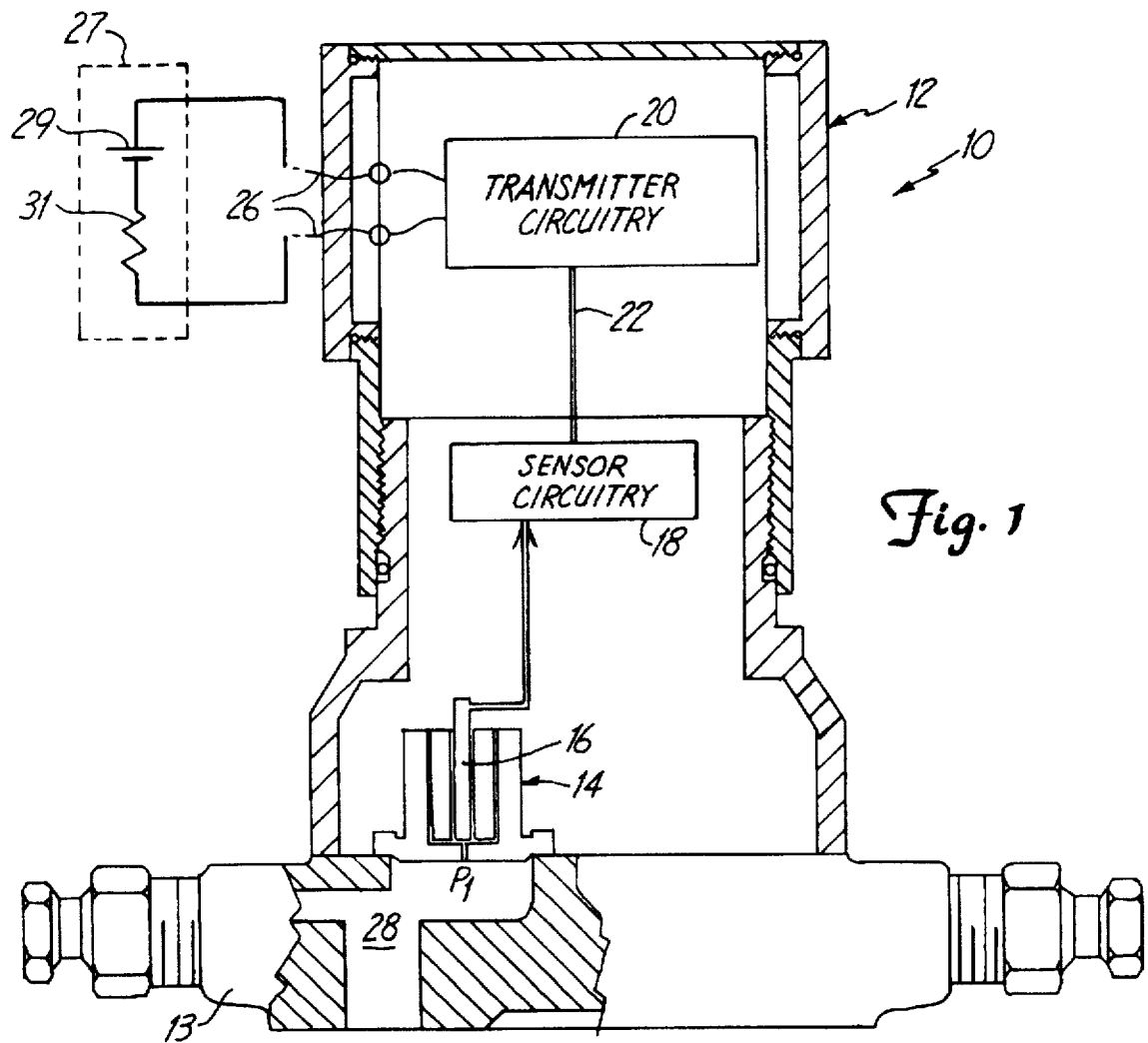
FIG. 1 is a fragmentary view showing a transmitter including a sensor assembly in accordance with one embodiment of the present invention.

FIG. 1 shows pressure transmitter 10 having transmitter body 12, flange 13 and pressure sensor assembly 14 in accordance with the present invention. Transmitter body 12 includes sensor circuitry 18 and transmitter circuitry 20. A pressure sensor 16 is carried in assembly 14 and couples to sensor circuitry 18. Pressure sensor 16 is responsive to pressure P1 in passageway 28 and flange 13. Sensor circuitry 18 couples to transmitter circuitry 20 through communication bus 22. Transmitter circuitry 20 sends information related to pressure P1 of process fluid over a two wire communication circuit 26. For example, this may be a 4–20 mA current loop or a process control industry standard HART® or Fieldbus loop. Transmitter 10 is wholly powered over circuit 26 from control room 27 having a voltage source 29 and resistor 31 in series.

Typically, pressure sensor assemblies use an oil as an isolation fluid. The oil is used to fill a cavity which is isolated from process fluid by an isolation diaphragm. As the diaphragm is deflected due to pressure from the process fluid, the deflection pressurizes the isolation fluid and a pressure sensor in the sensor assembly senses the pressure. This arrangement prevents the corrosive or otherwise damaging process fluid from directly contacting the pressure sensor.

The present invention recognizes that typical prior art sensor assemblies contribute errors to pressure measurements. First, the displacement of the isolation diaphragm requires a force to move the diaphragm, which reduces the pressure transferred to the isolation fluid. As a result, the actual pressure of the isolation fluid is less than the actual pressure of the process fluid. The amount of this error can be reduced by designing a diaphragm and sensor such that relatively little movement of the diaphragm occurs over the range of measured pressures. Second, it is desirable to use an isolation diaphragm which introduces a pressure error due to diaphragm displacement which is less than the maximum sensitivity of the pressure sensor. For example, a sensor assembly having a one inch diameter stainless steel isolation diaphragm with a thickness of 1 mil will have a pressure error of 0.0001 psi and have a volume displacement of $1 \times 10^{-4}$ cubic in. A pressure sensor with this amount of sensitivity and requiring approximately this volume displacement is described in co-pending U.S. patent application Ser. No. 08/395,778, entitled "CAPACITIVE PRESSURE SENSOR FOR A PRESSURE TRANSMITTER WHERE ELECTRIC FIELD EMANATES SUBSTANTIALLY FROM BACK SIDES OF PLATES" commonly assigned with the present application. Such a pressure sensor which may be brazed into the assembly is preferred since it reduces unnecessary volume of oil, as its integral feed through necessitates less oil volume than does a wire-bonded sensor.

Next, the error introduced due to compressibility of the oil can be reduced by minimizing the volume of the oil and by making the walls of the assembly which form the cavity for the oil as rigid as possible. Finally, one aspect of the present invention addresses error introduced through thermal expansion of components and thermal expansion of the isolation fluid. Specifically, the invention provides a thermal compensation member in the sensor assembly that compensates for dimensional variations due to thermal expansion.

Figure 2:
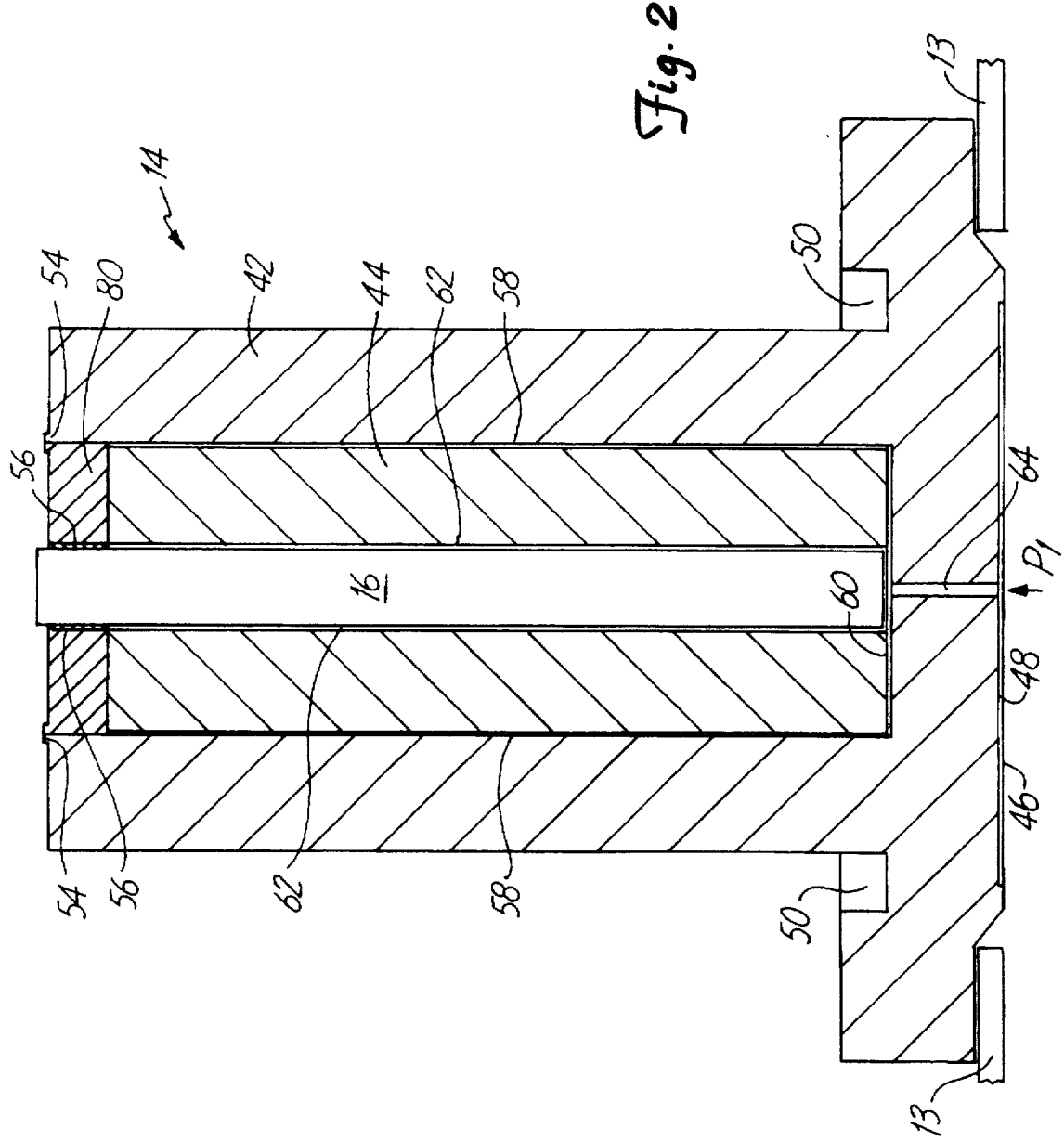
FIG. 2 is a cross-sectional view of the sensor assembly of FIG. 1.

FIG. 2 is a cross-sectional view of pressure sensor assembly 14 in accordance with one embodiment. Sensor assembly 14 is coupled to flange 13 of transmitter 10. Sensor assembly 14 includes sensor coupling 42 and low expansion collar 44 which provides a thermal compensation member in accordance with the invention. Isolation diaphragm 46 receives pressure P1 for passageway 28 and defines a diaphragm cavity 48 between isolation diaphragm 46 and a substantially flat face of sensor coupling 42. Sensor coupling 42 includes stress isolation regions 50 which are, in one embodiment, regions of reduced thickness in the base of coupling 42 which provide stress isolation. Collar 44 is coupled to sensor coupling 42 at TIG (Tungsten Inert Gas) weld 54 or by other appropriate means. Sensor 16 couples to cap 80 at braise joint 56. Collar 44 couples to cap 80, which comprises a low expansion ceramic, by a braze or other adhesive methods. A collar outer cavity 58 and collar lower cavity 60 are formed between collar 44 and sensor coupling 42. Collar inner cavity 62 is formed between collar 44 and pressure sensor 16. Passageway 64 couples cavities 58, 60 and 62 with cavity 48, forming a sensor cavity 82 filled with an incompressible isolation fluid such as an oil whereby pressure on diaphragm 46 is transferred to pressure sensor 16.

Figure 3:
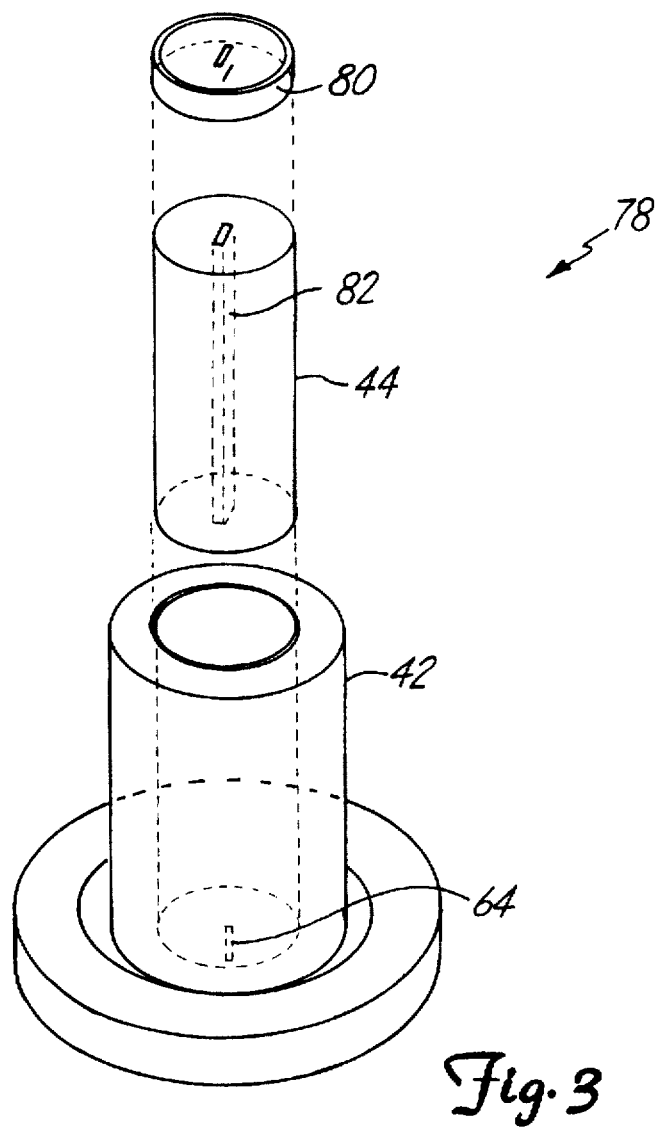
FIG. 3 is an exploded perspective view of the sensor assembly.

FIG. 3 is an exploded view of pressure sensor assembly 14. Ceramic-like cap 80 seals pressure sensor 16 (not shown in FIG. 3). Cap 80 is bonded to collar 44 which has sensor cavity 82 formed therein and adapted for receiving sensor 16. Collar 44 is received in coupling 42.

In one example embodiment, isolation diaphragm 46 has a 1 inch diameter and cavity 48 is 0.005 inches in depth, so as to provide overpressure protection when filled with oil. Passageway 64 has a diameter of 0.020 inches and is 0.200 inches in length. A cross-section of sensor 16 may be rectangular and there is a gap of 0.008 inches between sensor 16 and collar 44 which forms the collar inner cavity 62. The gap forming cavity 60 is 0.005 inches and the gap forming collar outer cavity 58 is 0.0015 inches. Sensor coupling 42 and collar are cylindrical in shape. Sensor coupling 42 may be of 316 stainless steel and lower expansion collar 44 is a material having a lower coefficient of expansion than of the stainless steel, such as a ceramic, for example cordierite, available from Superior Technical Ceramics of St. Albans, Vt. or Coors Ceramics Company of Golden, Colo. The temperature coefficient of expansion for cordierite is $2.1 \times 10^{-6}$ in/in °C. The collar outer cavity 58 is formed by an annular gap with a volume which increases with temperature to thereby compensate for volumetric thermal expansion of the fill fluid or other components in assembly 14.

Analysis of this design shows that the volumetric change of the cavity and fluid system over a temperature range of $-4°$ C. to $52°$ C. is $2.23 \times 10^{-5}$ cu. in. Thus, the pressure stays relatively constant over pressure because the sensor coupling expands at a greater rate than the cordierite thereby causing gap 58 to expand and compensate for expansion of the oil fill fluid.

The particular embodiments set forth herein are simply the preferred embodiments and a wide variation is considered to be within the scope of the present invention. The invention includes placement of a thermal compensation member within isolation fluid used to couple a pressure sensor to a pressure to be sensed. The thermal compensation member is selected to expand or contract, as appropriate, at a rate which is selected to compensate for thermal volumetric or spacial variations in components of the sensor assembly isolation fluid or other elements. In one preferred embodiment, the total volume of the isolation fluid is reduced and a pressure sensor is used which does not substantially deform under pressure. The invention may be used with any type of pressure sensor for measuring static pressure, gauge pressure, differential pressure, etc., or other parameters related to pressure, such as flow, level, etc. or parameters which are affected by expansion of components. The invention is particularly well suited for implementation in process control instruments such as transmitters in which the process fluid being sensed may be corrosive or contaminated which may lead to damage to the pressure sensor. Further, the particular dimensions, volumes, shapes, etc. are merely for one preferred design and may be modified for accuracy or other design constraints as appropriate.

Although the present invention has been described with reference to preferred embodiments, workers skilled in the art will recognize that changes may be made in form and detail without departing from the spirit and scope of the invention.

What is claimed is:

1. A transmitter for providing an output indicative of a pressure of a process fluid, comprising:
   a transmitter housing;
   transmitter circuitry in the transmitter housing for providing the output in response to a sensor output;
   a sensor coupling coupled to the transmitter housing defining a sensor cavity having a cavity volume filled with isolation fluid, the sensor coupling having a first thermal expansion coefficient;
   an isolation diaphragm coupled to the sensor coupling and defining the sensor body therein, the isolation diaphragm adapted to couple the pressure to the isolation fluid;
   a pressure sensor mounted in the sensor cavity and coupled to the isolation fluid, the pressure sensor providing the sensor output to the transmitter circuitry; and
   a thermal compensation member coupled to the cavity having a second thermal expansion coefficient to compensate for changes in the cavity volume due to thermal expansion of the sensor coupling.

2. The transmitter of claim 1 wherein the thermal compensation member is carried within the sensor cavity defined by the sensor coupling.

3. The transmitter of claim 1 wherein the thermal compensation member includes a cavity and the pressure sensor is carried within the cavity.

4. The transmitter of claim 1 wherein the thermal compensation member includes cordierite.

5. The transmitter of claim 1 wherein the second thermal expansion coefficient is less than the first thermal expansion coefficient.

6. The transmitter of claim 1 wherein the thermal compensation member fits within the sensor coupling and the cavity volume includes a outer cavity formed between the sensor coupling and the thermal compensation member.

7. The transmitter of claim 1 wherein the pressure sensor is carried within the thermal compensation member and the cavity volume includes an inner cavity defined between the thermal compensation member and the pressure sensor.

8. The transmitter of claim 1 wherein the transmitter circuitry output comprises a 4–20 mA signal.

9. The transmitter of claim 1 wherein the output comprises a digital signal.

10. The transmitter if claim 1 wherein the pressure sensor comprises sapphire.

11. The transmitter of claim 1 wherein the sensor comprises an elongated element coupled at one end to the sensor coupling.

12. The transmitter of claim 1 wherein the sensor coupling includes a region of reduced thickness to provide stress isolation to the pressure sensor.

* * * * *